United States Patent [19]

Carrier

[11] Patent Number: 4,478,382
[45] Date of Patent: Oct. 23, 1984

[54] PIVOTAL MOUNTING SYSTEM
[75] Inventor: John A. Carrier, Chilwell, England
[73] Assignee: Plessey Overseas Limited, Ilford, England
[21] Appl. No.: 409,829
[22] Filed: Aug. 20, 1982
[30] Foreign Application Priority Data Aug. 21, 1981 [GB] United Kingdom ............... 8125681

[51] Int. Cl.³ ............................................ F16M 11/10
[52] U.S. Cl. ..................................... 248/185; 248/176
[58] Field of Search .............. 248/185, 176, 177, 178, 248/179, 180, 293; 403/145, 146, 147

[56] References Cited

U.S. PATENT DOCUMENTS

| 2,231,487 | 2/1941 | Teuber | 248/293 |
| 2,625,426 | 1/1953 | Weymouth | 403/164 |
| 3,035,864 | 5/1962 | Davidson | 248/293 |
| 4,063,704 | 12/1977 | Rother | 248/176 |
| 4,225,105 | 9/1980 | Nakamura | 248/185 |
| 4,247,069 | 1/1981 | Kurz | 248/185 |
| 4,311,941 | 11/1982 | Hiraoka et al. | 403/146 |

Primary Examiner—William H. Schultz
Assistant Examiner—Ramon O. Ramirez
Attorney, Agent, or Firm—Fleit, Jacobson, Cohn & Price

[57] ABSTRACT

The cathode ray tube assembly of a visual display unit is suspended over the static base in a cradle, the suspension pivots being as close as possible to the center of gravity of the moving section. Attached to the underside of the cradle is a bracket with forked arms. The forks engage with a spindle carrying a pair of friction pads and a helical compression spring. The spindle runs in a curved slot in a bracket attached to the static base. The friction pads are situated one on each side of the bracket and are maintained in intimate contact with it by the helical spring generating a friction force. Thus a force of sufficient magnitude applied to the moving part of the visual display unit will overcome the friction force and permit it to move, although normally the friction force will hold it in the required position.

7 Claims, 2 Drawing Figures

PIVOTAL MOUNTING SYSTEM

BACKGROUND OF THE INVENTION

This invention relates to assemblies with a movable part and more particularly to an assembly in which the movable part can readily be moved from one position to another and is retained in that position.

More particularly the invention relates to a mounting system for a relatively heavy pivoted member which is regularly pivoted from one position to another whilst in use, such as a visual display unit, which may be pivoted from one position to another by one user or a number of different users.

A common method of permitting such regular pivoting of a relatively heavy member is to have a friction bearing or a handwheel on the pivot. A friction bearing however must have relatively high friction for a heavy member, particularly at high angles of pivot when the centre of gravity of the member is considerably displaced laterally of the pivot. Such high friction can make movement of the member difficult, and regular use can cause wear in the friction member necessitating regular adjustment or renewal of friction pads, washers etc. The use of a handwheel to tighten the pivot after every movement of the member is time consuming and undesirable for the users of a Visual Display unit as variable tightening torque are required with the unit in different positions. A high torques is required, for example, when the unit is at high angles of pivot.

This torque can be reduced by providing a lever extending from the pivot with an arcuate slot at the end of the lever which is engaged by a fixed tightening wheel or nut. Whilst this method does in fact reduce the tightening torque the method is still time consuming and can be dangerous, as too rapid loosening of the wheel or nut can cause the unit to swing rapidly down under its own weight.

Various other methods have been tried to overcome this problem such as the TV camera pivot disclosed in U.S. Pat. No. 4,225,105. This discloses a system of levers and slides arranged so that the camera is moved along a slide as it is pivoted so that the centre of gravity of the camera is always in a position to restore the camera to a horizontal position. A pivot tightening nut is provided to hold the camera in any described position, which again for a visual display unit is undesirable. The arrangement is also quite complex and expensive to produce.

SUMMARY OF THE INVENTION

It is an object of the present invention to provide a mounting system for a relatively heavy member which does not have a locking wheel or nut, and is fairly simple and cheap to manufacture.

The present invention therefore comprises a base member and a mounting member pivoted thereon, the pivot being substantially in alignment with the centre of gravity of the relatively heavy member when it is mounted on the mounting member, the mounting member having a lever extending to a position in which the end of the lever is adjacent to a bracket formed on the base member, the bracket being located remote from the pivot axis of the mounting member and having a slot which is engaged by the end of the lever, friction means being provided between the end of the lever and the slot whereby the mounting member can pivot and is retained in a predetermined position by the friction means.

Thus, since the relatively heavy member is pivoted substantially about its centre of gravity there is virtually no force to cause the member to swing from one position to another under its own weight and the force required on the end of the lever to hold the member in any angular position is very low and virtually constant. Thus, simple spring loaded friction washers are provided on the end of the lever which engage both sides of the slotted bracket.

The assembly is simple and therefore inexpensive, and the force required on the friction washers is low so they will not need regular adjustment or replacement.

An embodiment of the invention will now be described by example only with reference to the accompanying drawings.

FIG. 1 is a side elevation of a visual display unit having an assembly with a movable part according to the invention, FIG. 2 is a pictorial view of the assembly and FIG. 3 is a view from arrow 3 in FIG. 2.

DESCRIPTION OF THE PREFERRED EMBODIMENT

Figure 1:
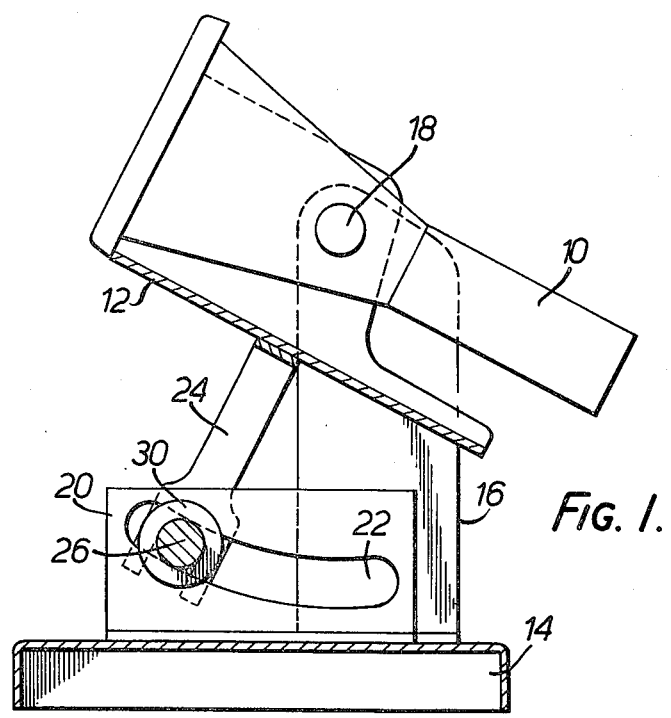
Figure 2:
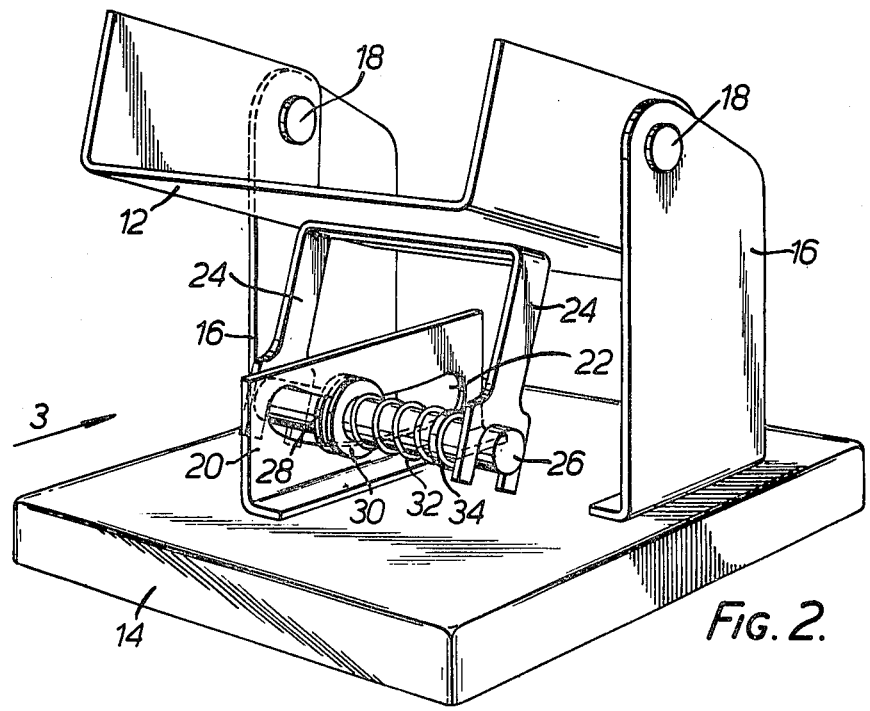
Figure 3:
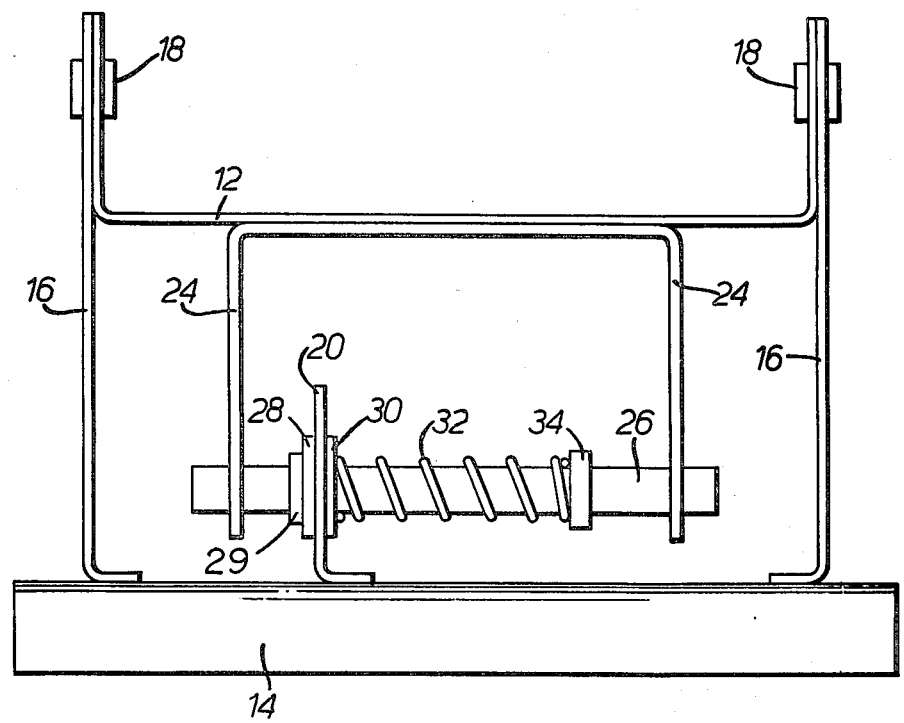

The visual display unit comprises a cathode ray tube 10 which is supported on a cradle 12 which can pivot relative to the base 14 of the unit so as to facilitate use by the operator of the visual display unit. Both the cathode ray tube and the base unit are normally enclosed within stylised housings, but these have not been shown in the interests of clarity.

The base 14 is provided with two upstanding supports 16, at the upper ends of which the cradle 12 is pivoted on pivot pins 18. Also provided on the base 14 is a vertically extending bracket 20 between the supports 16, the bracket 20 having an arcuate slot 22 formed therein with its centre on or substantially on the pivot axis of the cradle 12. When the cathode ray tube 10 and the enclosing housing is mounted on the cradle 12 the pivot axis of the cradle 12 is adjacent to or passes through the centre of gravity of the whole cathode ray tube assembly so that there is no or virtually no tendency for the cathode ray tube assembly to pivot about the pivot pins 18.

Secured to the underside of the cradle 12 are two arms 24 the lower ends of which are forked to loosely accommodate a spindle 26 which engages the forked portion of each of the arms 24. The spindle 26 has a diameter which permits it to pass through the arcuate slot 22 with a small clearance only. Rigidly secured to the spindle 26 is a stop 29 and against the stop abuts is a disc 28 formed of high friction material, the diameter of the disc 28 being large enough to present a fairly large surface area to one side of the bracket 20 above and below the arcuate slot 22. Axially movably mounted on the spindle 26 on the opposite side of the bracket 20 is a further disc 30 of high friction material and this disc is urged towards the bracket 20 by a helical compression spring 32. The opposite end of the spring 32 abuts a stop 34 formed on the spindle 26.

Since the spindle is free to move within the forked ends of the arms 24 the spring 32 has the effect of axially adjusting the position of the spindle 26 until the two friction discs 28 and 30 apply substantially equal pressures to opposite sides of the bracket 20 and thus act as a brake. Thus normally the discs 28 and 30 hold the cradle in any desired position, but by manually pivoting the whole cathode ray tube assembly the discs 28 and 30 move along the slot until the required position for the assembly is reached. Since the discs 28 and 30 are remote from the pivot pins 18 a mechanical advantage exists and the spring 32 needs only to apply a relatively low force, even if the centre of gravity of the cathode ray tube assembly is not exactly on the pivot axis of the cradle 12.

Many modifications to the arrangement may be made without departing from the spirit of the invention. Thus, for example, only one friction disc may be used or the bracket 20 may be located in a different position although still remote from the pivot axis. Alternatively friction members may be secured to a portion of the base and act on one or both of the arms 24, or only a single arm may be provided.

What we claim is:

1. A mounting system for a relatively heavy article, said system comprising:
   a base member, pivot means and a mounting member, said mounting member being pivoted by said pivot means on said base member, said pivot means being located substantially in alignment with the centre of gravity of an article to be received on said mounting member, a bracket formed on said base member in a position remote from said pivot means and defining a slot, a lever, extending from said mounting member such that its end is adjacent to said bracket and engages said slots formed in said bracket, said bracket friction means located between said end of said lever and said slot whereby said mounting member can pivot on said pivot means and is retained in a predetermined position by said friction means.

2. A mounting system as claimed in claim 1 comprising a spindle, said spindle passing through said slot and being engaged by said end of said lever.

3. A mounting system as claimed in claim 2 in which said slot is arcuate with its centre substantially on the axis of said pivot means.

4. A mounting system as claimed in claim 2 in which said spindle carries a disc of high friction material which contacts the side of said bracket.

5. A mounting system as claimed in claim 2 comprising two levers, one end of each said lever engaging each end of said spindle.

6. A mounting system as claimed in claim 2 in which said spindle carriers two discs of high friction material, said discs contacting opposite sides of said bracket.

7. A mounting system as claimed in claim 6 in which said discs are urged into contact with said bracket by spring means.

* * * * *